US006691112B1

(12) United States Patent
Siegel et al.

(10) Patent No.: US 6,691,112 B1
(45) Date of Patent: Feb. 10, 2004

(54) METHOD FOR INDEXING AND MANAGING A SEARCHABLE COMMUNITY OF NON-HTML INFORMATION

(75) Inventors: Stanley M. Siegel, Yukon, PA (US); Darren M. Siegel, Yukon, PA (US)

(73) Assignees: Darren Michael Siegal, Monroeville, PA (US); Dennis Craig Siegel, Yukon, PA (US)

( * ) Notice: Subject to any disclaimer, the term of this patent is extended or adjusted under 35 U.S.C. 154(b) by 285 days.

(21) Appl. No.: 09/630,476

(22) Filed: Aug. 1, 2000

(51) Int. Cl.[7] .............................. G06F 17/30; G06F 7/00
(52) U.S. Cl. ................................ 707/10; 707/2; 707/3; 705/27; 705/28; 715/51; 715/3; 709/218; 709/219
(58) Field of Search ................ 707/10, 1–5; 705/26–29; 715/513; 709/218, 219

(56) References Cited

U.S. PATENT DOCUMENTS

| | | | | |
|---|---|---|---|---|
| 5,694,551 A | * | 12/1997 | Doyle et al. ................... | 705/26 |
| 5,712,989 A | * | 1/1998 | Johnson et al. ................ | 705/28 |
| 5,721,906 A | | 2/1998 | Siefert ........................ | 395/609 |
| 5,727,164 A | | 3/1998 | Kaye et al. ................... | 395/228 |
| 5,729,733 A | | 3/1998 | Sharif-Askary ............. | 395/608 |
| 5,734,719 A | | 3/1998 | Tsevdos et al. ................ | 380/5 |
| 5,758,328 A | * | 5/1998 | Giovannoli ................... | 705/26 |
| 5,825,881 A | * | 10/1998 | Colvin, Sr. ................... | 705/78 |
| 5,884,035 A | | 3/1999 | Butman et al. ........ | 395/200.48 |
| 5,890,136 A | | 3/1999 | Kipp ............................ | 705/22 |
| 5,897,622 A | * | 4/1999 | Blinn et al. ................... | 705/26 |
| 5,911,143 A | | 6/1999 | Deinhart et al. ............. | 707/103 |
| 5,918,227 A | * | 6/1999 | Polnerow et al. ............. | 707/10 |
| 5,920,856 A | * | 7/1999 | Syeda-Mahmood ............ | 707/3 |
| 5,924,094 A | | 7/1999 | Sutter .......................... | 707/10 |
| 5,940,807 A | * | 8/1999 | Purcell ........................ | 705/26 |
| 5,956,727 A | | 9/1999 | Cheng et al. ................ | 707/102 |
| 5,983,218 A | * | 11/1999 | Syeda-Mahmood ............ | 707/3 |
| 5,987,506 A | | 11/1999 | Carter et al. ................. | 709/213 |

(List continued on next page.)

FOREIGN PATENT DOCUMENTS

| | | | | |
|---|---|---|---|---|
| EP | 0 697 669 A2 | 2/1996 | ........... | G06F/17/60 |
| JP | 10-320494 | 12/1998 | ........... | G06F/17/60 |
| JP | 11-161673 | 6/1999 | ........... | G06F/17/30 |

OTHER PUBLICATIONS

PC Week "Startup Aims to Help Stores Set Up Shop on an Internet Mall", PC Week Magazine, p. 72, Nov. 7, 1994.*

(List continued on next page.)

Primary Examiner—Jean R. Homere
Assistant Examiner—Luke S Wassum
(74) Attorney, Agent, or Firm—Richard C. Litman

(57) ABSTRACT

A method for indexing and managing a searchable community of non-HTML information. The method utilizes an electronic search engine which indexes data files used by sites created by website generation software. The indexing process of the search engine indexes HTML and non-HTML information from websites enrolled in an electronic community. The non-HTML data includes a database from which enrolled websites operate. This information is downloaded over HTTP, parsed, and indexed with unique parameters into a database running on the search engine. The search portion of the search engine process operates like standard search engines. A user submits a request over HTTP to the search engine. The search engine processes the search request and presents the results to the user in a dynamically created HTML page. The only unique feature of this portion of the process is that the links to the search results are constructed with the necessary parameters to allow the target websites to be hyperlinked, with the appropriate dynamic content being shown.

12 Claims, 10 Drawing Sheets

U.S. PATENT DOCUMENTS

| | | | | |
|---|---|---|---|---|
| 6,003,019 | A | | 12/1999 | Eaton et al. ................... 705/42 |
| 6,014,639 | A | | 1/2000 | Fohn et al. .................... 705/27 |
| 6,067,527 | A | | 5/2000 | Lovell et al. ................. 705/21 |
| 6,081,789 | A | * | 6/2000 | Purcell ........................ 705/37 |
| 6,094,649 | A | * | 7/2000 | Bowen et al. ................. 707/3 |
| 6,263,352 | B1 | * | 7/2001 | Cohen ........................ 715/513 |
| 6,336,100 | B1 | * | 1/2002 | Yamada ....................... 705/26 |
| 6,338,050 | B1 | * | 1/2002 | Conklin et al. ............... 705/80 |
| 6,397,219 | B2 | * | 5/2002 | Mills ........................... 707/10 |
| 2001/0044751 | A1 | * | 11/2001 | Pugliese et al. .............. 705/26 |
| 2002/0023007 | A1 | * | 2/2002 | Lee ............................. 705/26 |
| 2002/0072974 | A1 | * | 6/2002 | Pugliese et al. .............. 705/14 |

OTHER PUBLICATIONS

Edge "Internet Shopping: MCI Introduces InternetMCI", Edge Trade Newsletter, Nov. 28, 1994.*

BusinessWire "Mecklermedia and Intuitive Systems Redefine Online Shopping", Dec. 7, 1994.*

Gillen, M.A. "Selling Online: Some Cyber-Shoppers Are Already Trying and Buying in Wall-less Malls", Billboard, vol. 107, No. 33, pp. 66+, Aug. 19, 1995.*

Avalos, G. "California-Based eShop Offers On-Line Shoppers Security Guarantee", Contra Costa Times, Nov. 7, 1995.*

Wilder, C. "E-Commerce Emerges", InformationWeek, No. 584, p. 14, Jun. 17, 1996.*

Semilof, M. "Microsoft Goes Shopping at Online Mall", CommunicationsWeek, No. 616, p. 49, Jun. 24, 1996.*

Arden, R.K. "Safe Internet Shopping with Microsoft Merchant System", Windows & .NET Magazine, InstantDoc #2799, downloaded from www.winntmag.com, Nov. 1996.*

Hancock, J.S. "Getting Started with Microsoft Merchant Server", Windows & .NET Magazine, InstantDoc #92, downloaded from www.winntmag.com, Jun. 1997.*

NexTag.com "NexTag.com Launches First Online Buying Service Where Name Brand Sellers Compete for Buyers", Press Release, Aug. 9, 1999.*

Advanced Book Exchange, Inc. "HomeBase v. 1.1 User's Guide", 1999.*

AbeBook.com "Bookseller Information", downloaded from www.abebooks.com, Mar. 1, 2000.*

Graven, M.P. "e-Store Solutions", PC Magazine, vol. 19, No. 18, pp. 146–161, Oct. 17, 2000.*

Savetz, K. and A. Crane "Web Buyer—Site Reviews for On-Line Shopping", Computer Shopper, p. 201+, Nov. 1, 2000.* iCat "Benefits and Features of iCat Web Store", downloaded from www.icat.com, Nov. 9, 2000.* iCat "Frequently Asked Questions about iCat Web Store", downloaded from www.icat.com, Nov. 19, 2000.*

Salkever, A. "Will Froogle Be a Google for Shoppers?", BusinessWeek Online, downloaded from www.businessweek.com, Jan. 14, 2003.*

PriceGrabber.com "How To Sell", downloaded from www-.pricegrabber.com, May 2003.*

NexTag "About NexTag, Inc.", downloaded from www.nextag.com, May 2003.*

Froogle "About Froogle", downloaded from froogle.google-.com, May 2003.*

FreeMerchant "Catalog Importer Tutorial", downloaded from www.freemerchant.com, Aug. 2003.*

* cited by examiner

METHOD FOR INDEXING AND MANAGING A SEARCHABLE COMMUNITY OF NON-HTML INFORMATION

BACKGROUND OF THE INVENTION

1. Field of the Invention

The present invention relates to electronic search engines. Specifically, the invention is a method for indexing and managing a searchable community of non-Hypertext Markup Language (non-HTML) information.

2. Description of the Related Art

The need for efficient and effective electronic business creation and management systems is increasing in the current market. Small retail business owners in particular generally do not have the funds to acquire or use large servers and the computing power needed to compete with large retailers with online merchandising capabilities. Online commerce systems also lack compatibility with their physical counterparts, often selling out of stock items before the system can be updated. Additionally, retail customers searching and shopping online are bogged down with superfluous and unrelated advertisements and information resulting in poor results.

Given the importance of electronic business and management methods, it is no surprise that several other inventors have proposed various processes and systems for electronic organization. However, no other process combines all the advantages of the present invention having ease of use, method of management, method of electronic business creation and method of business process.

The related art is represented by the following patents of interest.

U.S. Pat. No. 5,694,551, issued on Dec. 2, 1997 to John D. Doyle et al., which describes a computer integrated network for channeling customer orders through a centralized computer to various suppliers. Customers have access to an electronic catalog and are able to place orders through a central computer system which then sends the orders to associated internal suppliers or outside vendors who ship directly to the customer. Doyle et al. do not suggest a method for indexing and managing a searchable community of non-HTML information according to the claimed invention.

U.S. Pat. No. 5,721,906, issued on Feb. 24, 1998 to David M. Siefert, describes a system for managing resources which can take the form of computer-compatible information, such as data files and program, non-computer-compatible information, such as, data contained on microfiche, and physical objects. Such resources are located at geographically different locations, and are given descriptive profiles that may be searched by a user in order to retrieve such a resource. A selected resource may then be ordered and delivered to an authorized user. Siefert does not suggest a method for indexing and managing a searchable community of non-HTML information according to the claimed invention.

U.S. Pat. No. 5,727,164, issued on Mar. 10, 1998 to Eugene G. Kaye et al., describes an apparatus and method for managing the availability of items using a computer system. Such a system allows a variety of computers to access a database of categorized items. Kaye et al. do not suggest a method for indexing and managing a searchable community of non-HTML information according to the claimed invention.

U.S. Pat. No. 5,825,881, issued Oct. 20, 1998 to Bryan, Colvin, Sr., describes a system for conducting electronic commerce over the Internet. Such a system serves as a link between merchants, customers, and a bank or credit card processor. Colvin, Sr. does not suggest a method for indexing and managing a searchable community of non-HTML information according to the claimed invention.

U.S. Pat. No. 5,890,136, issued on Mar. 30, 1999 to Ludwig Kipp, describes a mass retail system for ordering and purchasing items electronically for pickup at an automated store. Kipp does not suggest a method for indexing and managing a searchable community of non-HTML information according to the claimed invention.

U. S. Pat. No. 5,924,094, issued on Jul. 13, 1999 to Herbert P. Sutter, describes an independent distributed database system including a plurality of sites that may work offline using local data. Each stores only the data it needs while an online transaction occurs only when necessary to update or change a system. Sutter does not suggest a method for indexing and managing a searchable community of non-HTML information according to the claimed invention.

U.S. Pat. No. 5,940,807, issued Aug. 17, 1999 to Daniel S. Purcell, describes a method for controlling the collection, processing, and dissemination by a host regarding product or service availability. Sellers approved by the host are granted access to the system for providing inventory information. Such information is organized and cross referenced with a buyers list to provide for a purchase transaction. Purcell does not suggest a method for indexing and managing a searchable community of non-HTML information according to the claimed invention.

U.S. Pat. No. 6,003,019, issued on Dec. 14, 1999 to Morag M. Eaton et al., describes a multiple transaction service system in which a customer can request and receive financial service. Such a service can be accessed through a variety of different channels that are all connected through a channel manager. Eaton et al. do not suggest a method for indexing and managing a searchable community of non-HTML information according to the claimed invention.

U.S. Pat. No. 6,067,527, issued on May 23, 2000 to Christopher D. Lovell et al., describes a point of sale system and a method of operation and a control program for use within the point of sale system. Such a system includes a remote site that communicates with the site controller through a communication link. Lovell et al. do not suggest a method for indexing and managing a searchable community of non-HTML information according to the claimed invention.

European Patent document 0 697 669 A2, published on Feb. 21, 1996, describes an electronic sourcing system and method that maintains a database of product information related to items available from vendor catalogs. Information about the item includes identification of the item so that a user may find the item by searching using a specific word or phrase. The system can check to see if the requested item is available in one or more inventories and may generate a purchase order. Europe '669 does not suggest a method for indexing and managing a searchable community of non-HTML information according to the claimed invention.

Japan Patent document 10-320494, published on Dec. 12, 1998, describes a central market system which informs a market client system of market setting information such as market contents, market setting time or the like from a notifying part. Japan '494 does not suggest a method for indexing and managing a searchable community of non-HTML information according to the claimed invention.

Other electronic management processes are available in the prior art, but none of them disclose a method for indexing and managing a searchable community of non-HTML information as disclosed herein. For example, U.S. Pat. No. 5,729,733, issued on Mar. 17, 1998 to Jamshid Sharif-Askary, discloses a method of maintaining a distributed database among independently operable sites in which database availability is not interrupted during database update. U.S. Pat. No. 5,734,719, issued on Mar. 31, 1998 to James T. Tsvedos et al., discloses a digital information accessing, delivery, and production system. U.S. Pat. No. 5,884,035, issued on Mar. 16, 1999 to Ronald A. Butman et al., discloses a dynamic distributed group registry apparatus and method for collaboration and selective sharing of information. U.S. Pat. No. 5,911,143, issued on Jun. 8, 1999 to Klaus Deinhart et al., discloses a method and system for registration, authorization, and control of access rights computer system. U.S. Pat. No. 5,918,227, issued on Jun. 29, 1999 to Dean Polnerow et al., discloses an online directory service with a plurality of databases and a processing system with a plurality of processors. U.S. Pat. No. 5,956,727, issued on Sep. 21, 1999 to Tu-An Cheng et al., discloses a heterogeneous database system which includes plural database systems, wherein one of the database systems acts as a system manager. U.S. Pat. No. 5,987,506, issued on Nov. 16, 1999 to John B. Carter et al., discloses a computer system which employs a globally addressable storage environment that allows a plurality of networked computers to access data by addressing even when the data is stored on a persistent storage device such as a computer hard disk and other traditionally non-addressable data storage devices. U.S. Pat. No. 6,014,639, issued on Jan. 11, 2000 to Steffan M. Fohn et al., discloses an electronic catalog system for exploring a multitude of hierarchies using attribute relevance and forward checking. Japan Patent document 11-161673, published on Jun. 18, 1999, describes a catalog generation system. None of these patents suggest a method for indexing and managing a searchable community of non-HTML information according to the claimed invention.

None of the above inventions and patents, taken either singularly or in combination, is seen to describe the instant invention as claimed.

SUMMARY OF THE INVENTION

The invention is a method for indexing and managing a searchable community of non-HTML information. The method utilizes an electronic search engine which indexes data files used by sites created by website generation software. The indexing process of the search engine indexes HTML and non-HTML information from websites enrolled in an electronic community. The non-HTML data includes a database from which enrolled websites operate. This information is downloaded over HTTP, parsed, and indexed with unique parameters into a database running on the search engine. The search portion of the search engine process operates like standard search engines. A user submits a request over HTTP to the search engine. The search engine processes the search request and presents the results to the user in a dynamically created HTML page. The only unique feature of this portion of the process is that the links to the search results are constructed with the necessary parameters to allow the target websites to be hyperlinked, with the appropriate dynamic content being shown.

Accordingly, it is a principal object of the invention to provide a search engine for a group of similarly created and managed electronic retail stores.

It is another object of the invention to provide a search engine to list stores or items within the group by category as defined by the user.

It is a further object of the invention to return information via hypertext links so as to be easily accessible by the user.

Still another object of the invention is to provide a level of confidence in the electronic stores by allowing a consumers to give feedback to be displayed on such a site.

It is an object of the invention to provide improved elements and arrangements thereof in a method for indexing and managing a searchable community of non-HTML information for the purposes described which is inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

Figure 1A:
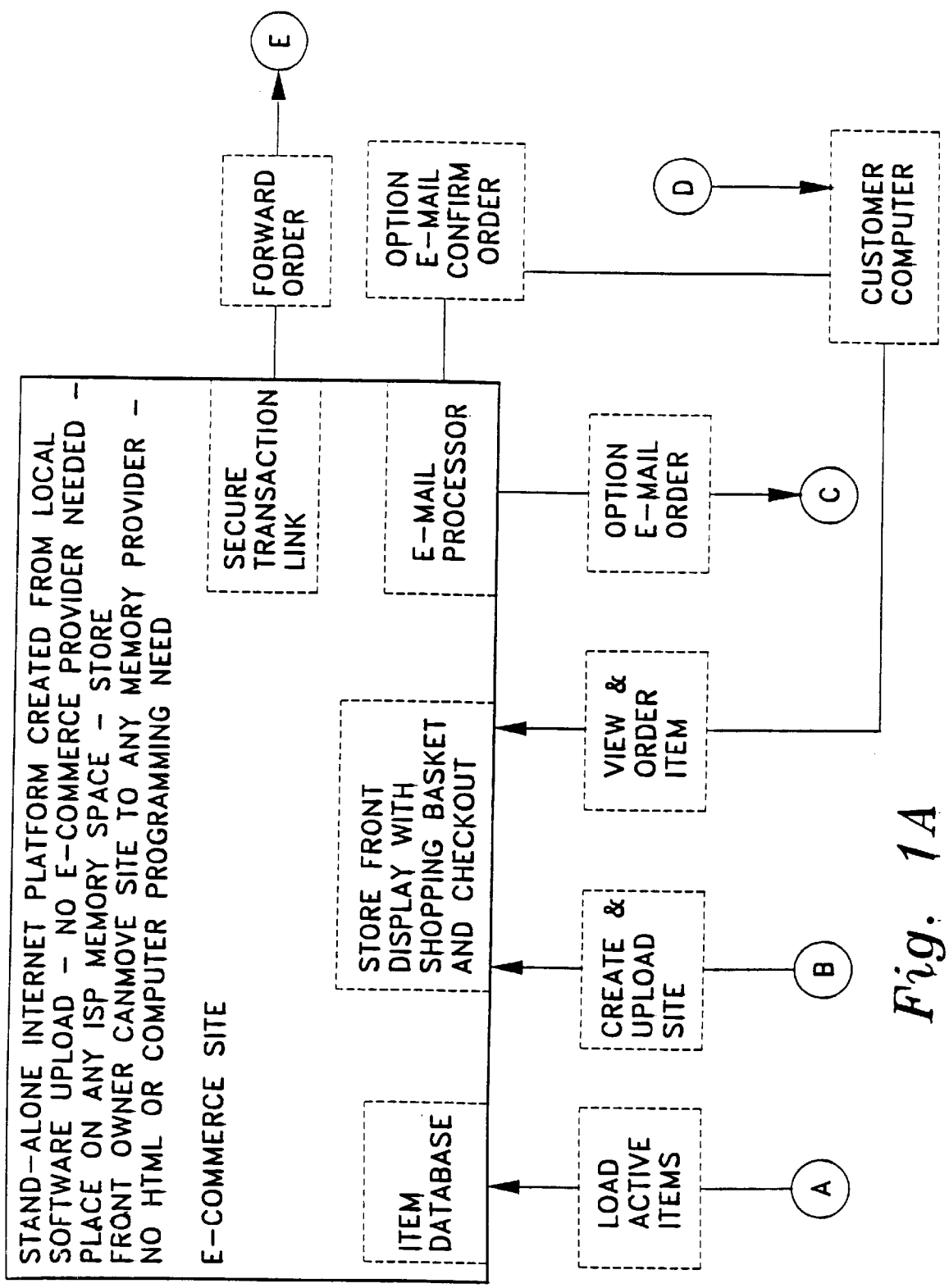
FIGS. 1A and 1B are a block diagram of the proprietary e-commerce software enabling a stand alone Internet platform according to the present invention.
Figure 1B:
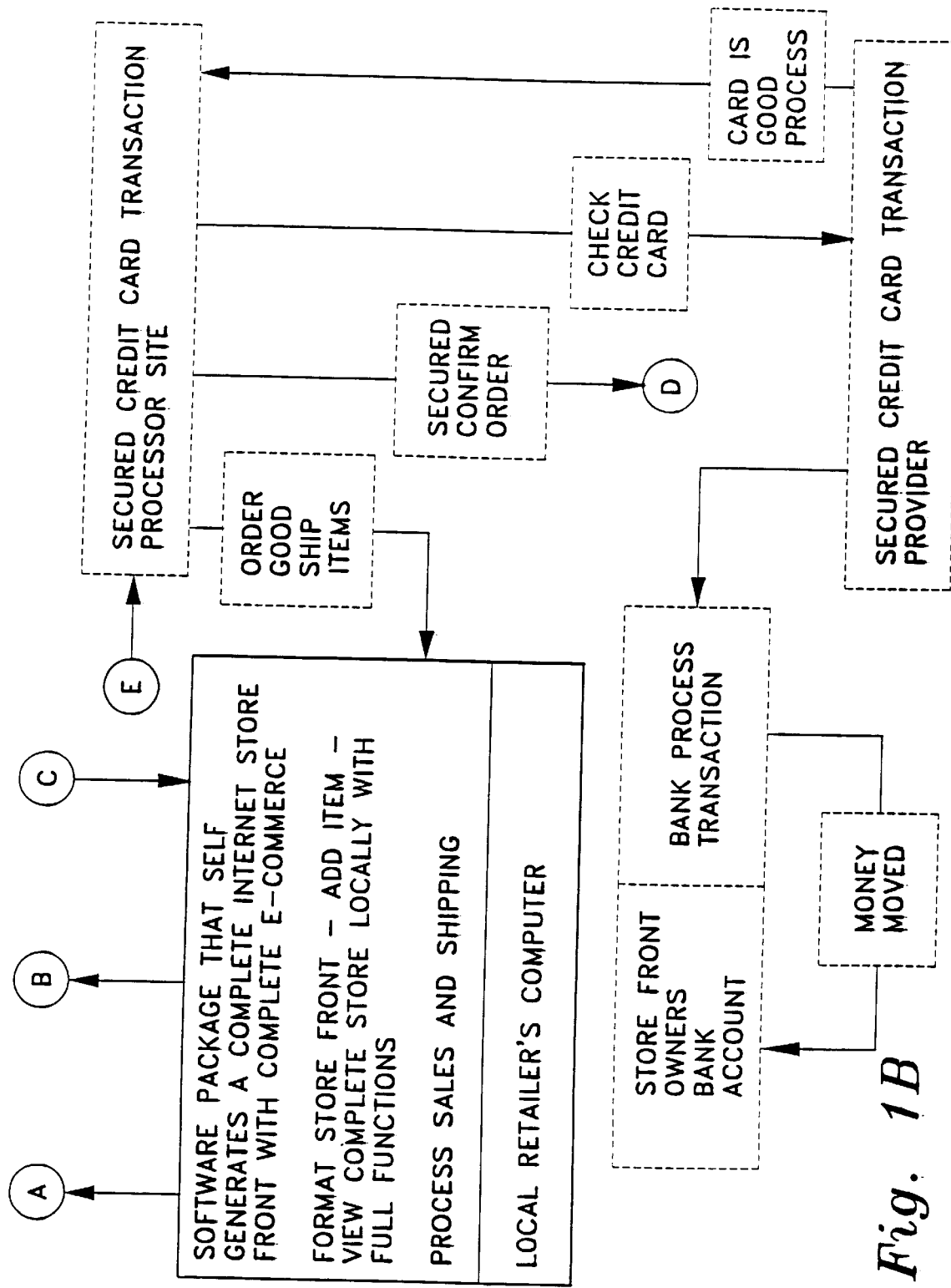
Figure 2A:
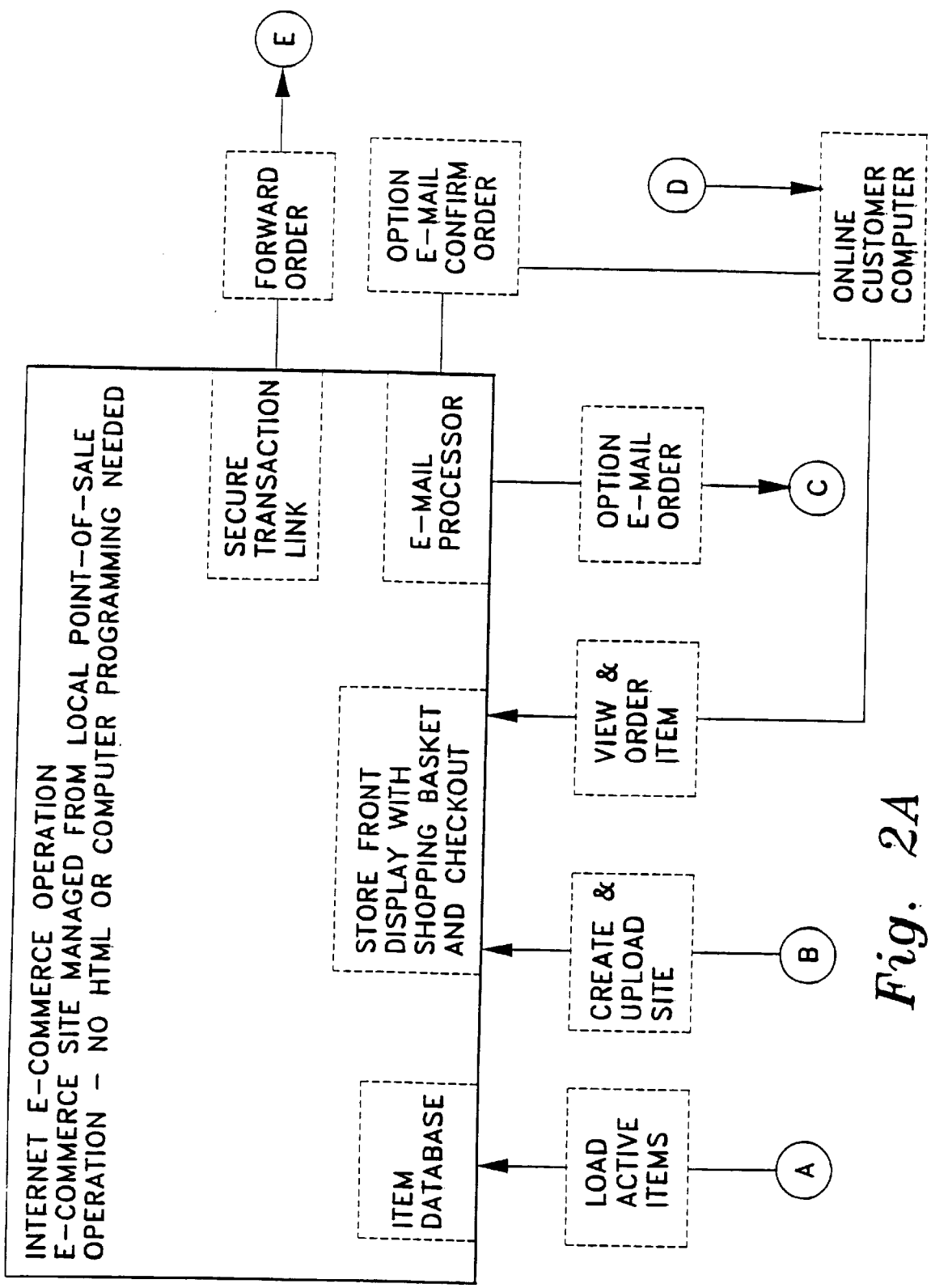
FIGS. 2A and 2B are a block diagram of the inventory management system to integrate point of sales and Internet operations according to the present invention.
Figure 2B:
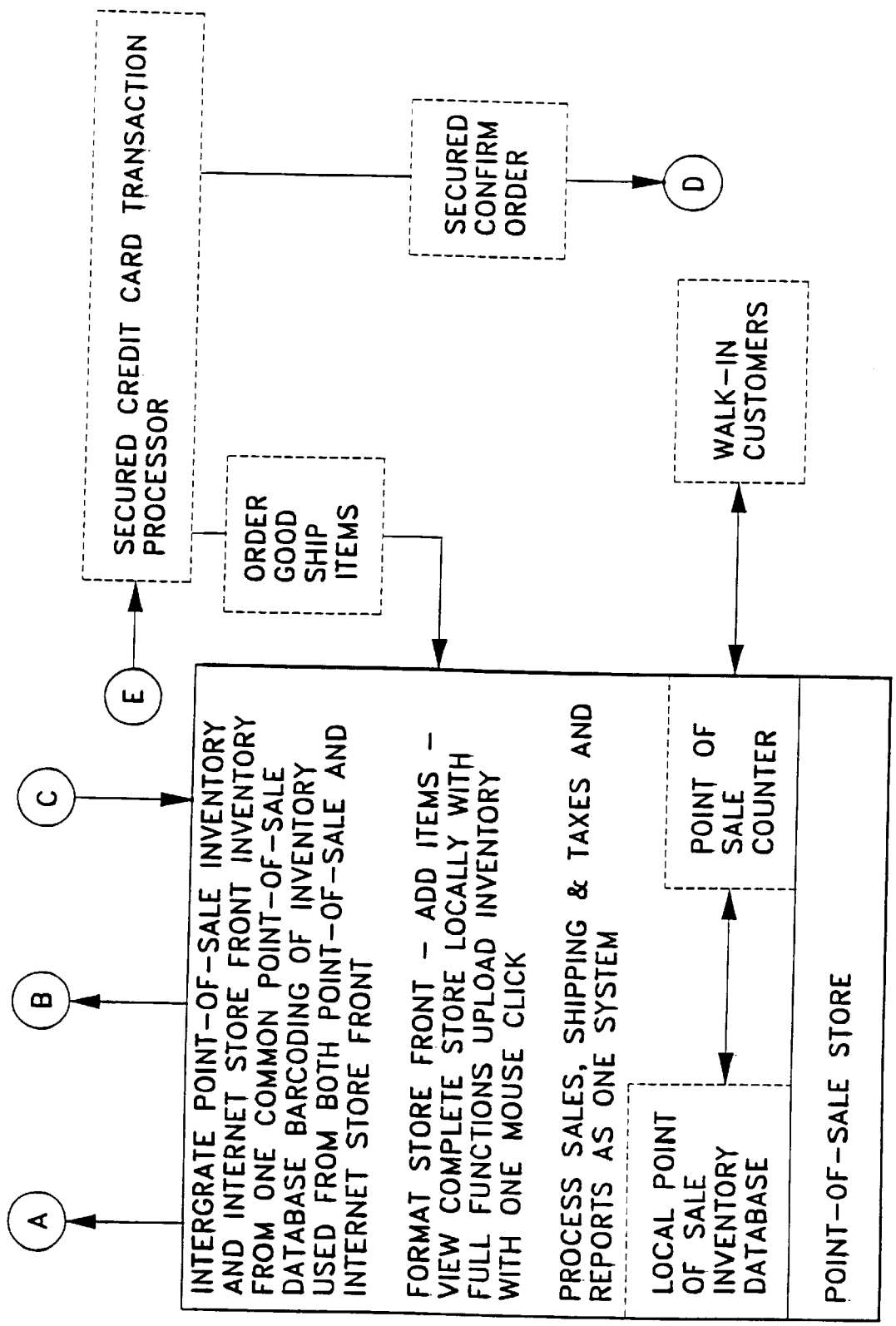
Figure 3A:
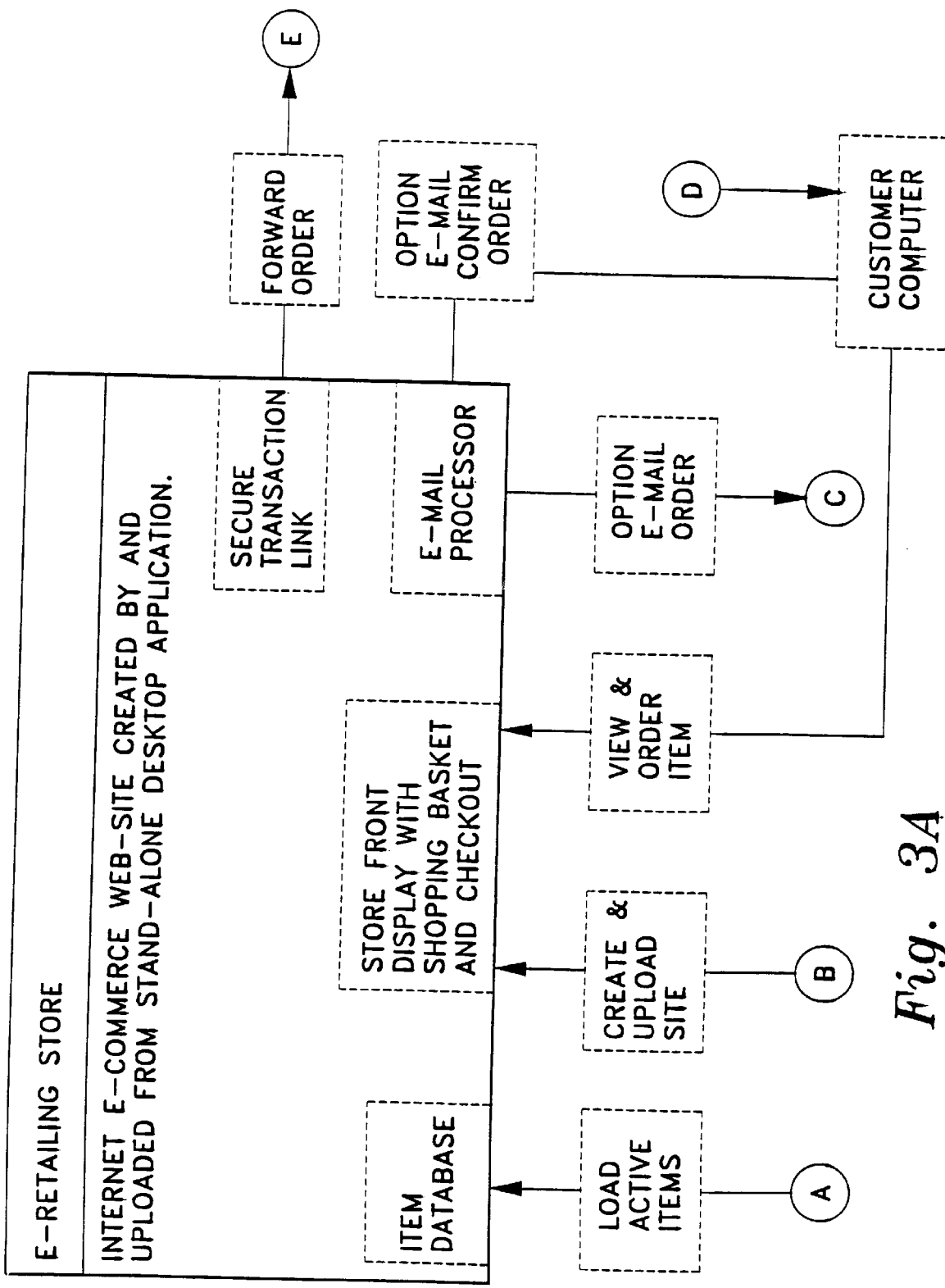
FIGS. 3A and 3B show a flow diagram of the business process for simultaneous integration and management of e-retailing and existing storefront operations according to the present invention.
Figure 3B:
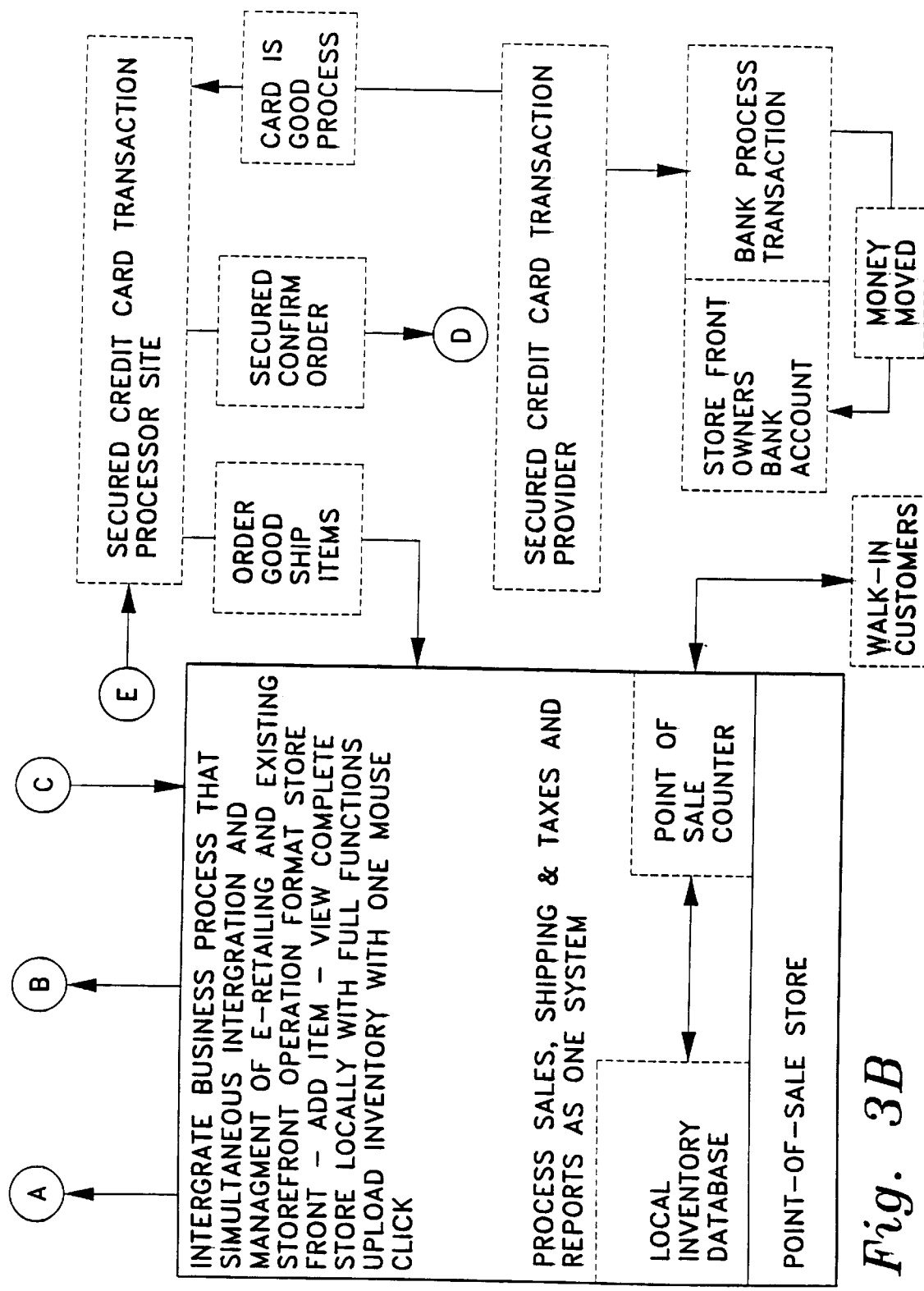
Figure 4A:
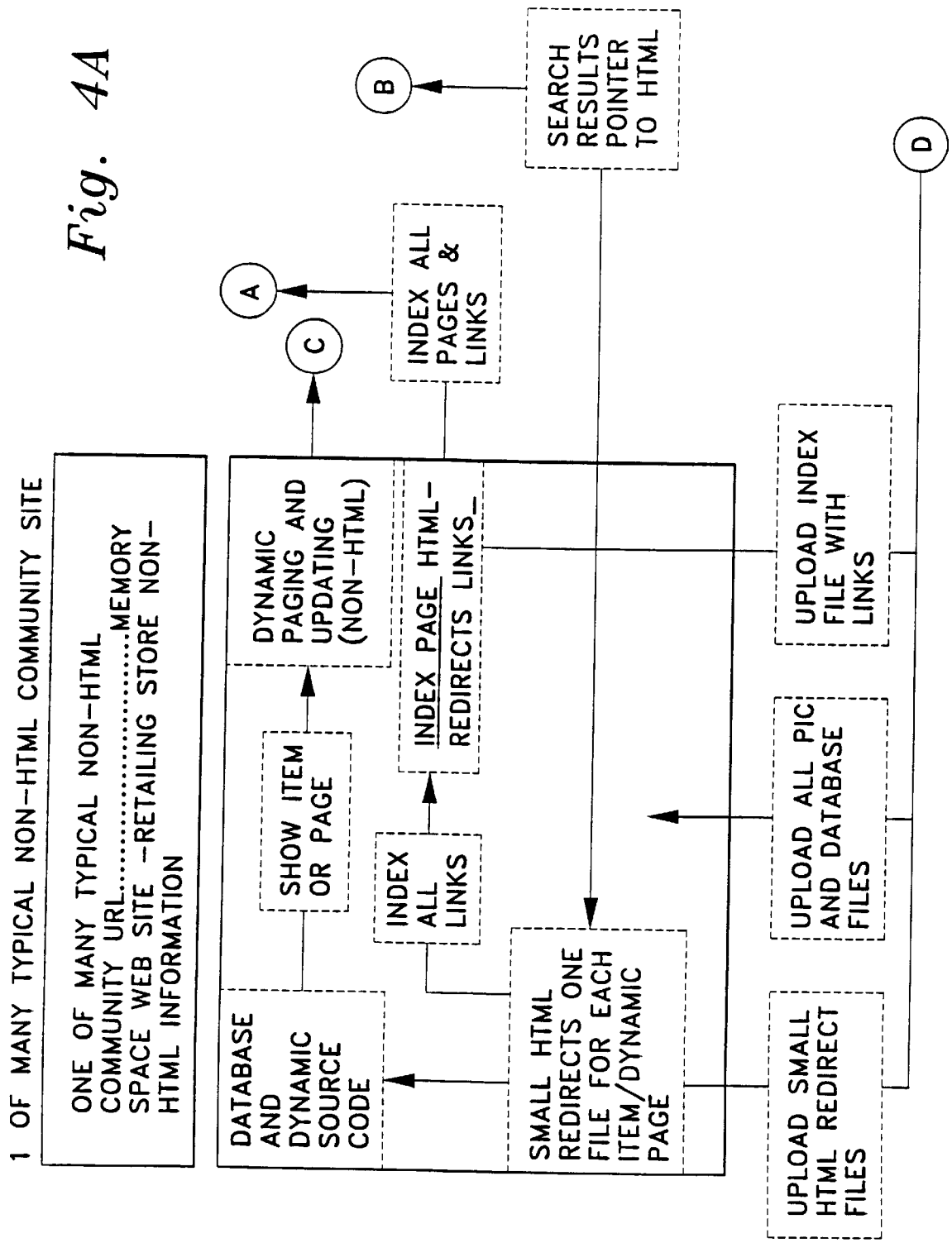
FIGS. 4A and 4B are a block diagram of the method for indexing and managing a searchable community of non-HTML information according to the present invention using an existing search engine model.
Figure 4B:
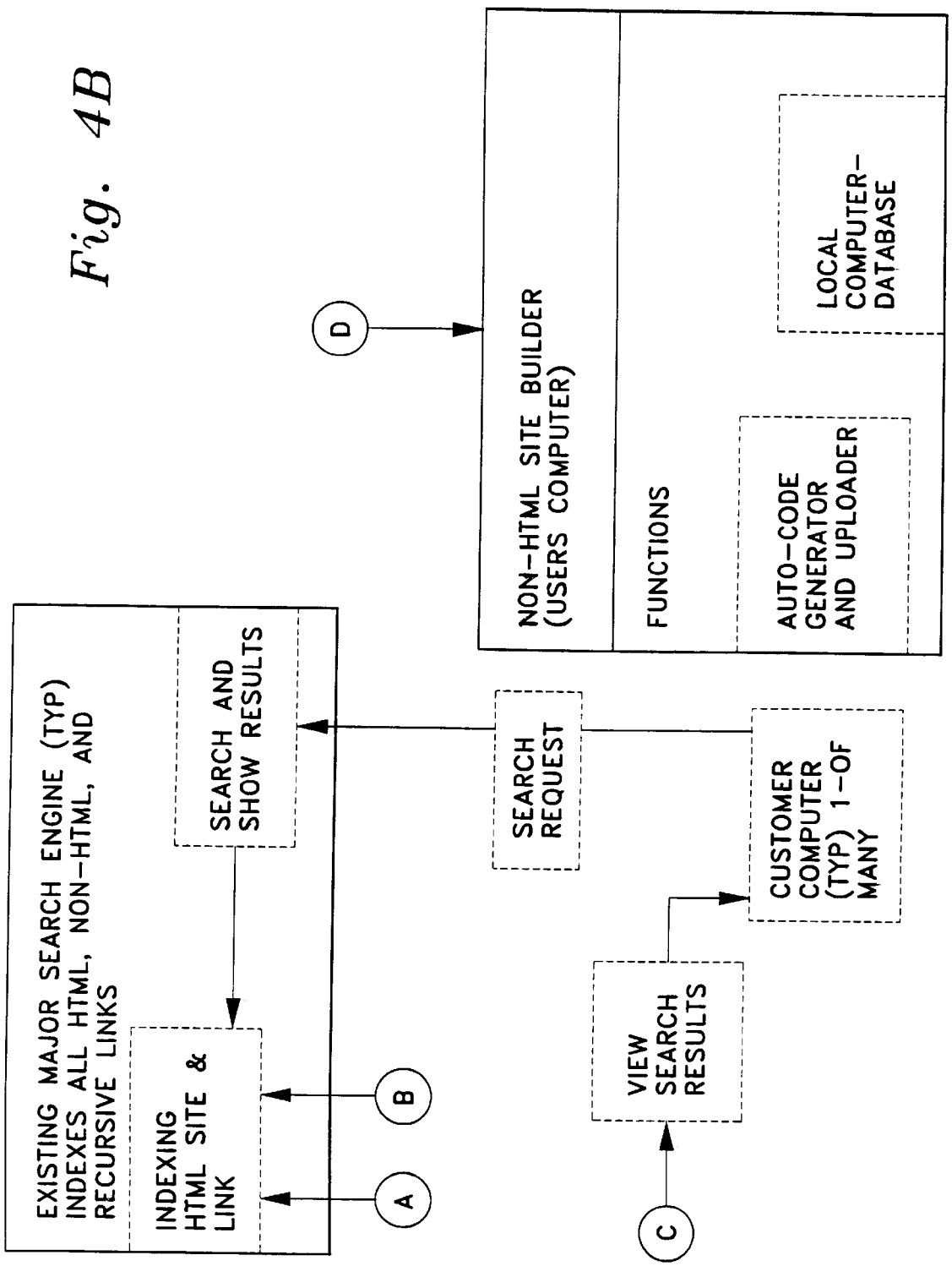

The present invention is a method for indexing and managing a searchable community of non-HTML information. The invention disclosed herein is, of course, susceptible of embodiment in many different forms. Shown in the drawings and described hereinbelow in detail is a preferred embodiment of the invention. It is to be understood, however, that the present disclosure is an exemplification of the principles of the invention and does not limit the invention to the illustrated embodiment.

The method for indexing and managing a searchable community of non-html information is utilized in conjunction with an electronic community. The electronic community is specifically a group of electronic retail storefronts created by electronic commerce software to have similar architecture and design. The electronic storefronts have inventory available for search in real time so that items are not ordered that are out of stock. The search engine provides consumers with the ability to organize items and retailers by category and search for specific merchandise. The search can be conducted using multiple word forms, space delineated forms, and boolean operators. Entries returned to the customer by the engine provide information on the items and links to the storefronts where they are available. The search engine gives registered customers the option to give feedback and ratings to the storefronts which is then displayed to provide confidence in the site. The search engine is also capable of displaying banners of advertisements, sales, and specials from information given by the owners.

The method for indexing and managing a searchable community of non-HTML information utilizes an electronic search engine which indexes data files used by sites created by website generation software. The indexing process of the search engine indexes HTML and non-HTML information from websites enrolled in an electronic community. The non-HTML data includes a database from which enrolled websites operate. This information is downloaded over HTTP, parsed, and indexed with unique parameters into a database running on the search engine. The search portion of the search engine process operates like standard search engines. A user submits a request over HTTP to the search engine. The search engine processes the search request and presents the results to the user in a dynamically created HTML page. The only unique feature of this portion of the process is that the links to the search results are constructed with the necessary parameters to allow the target websites to be hyperlinked, with the appropriate dynamic content being shown.

The search engine is specially formatted to deal with a group of similarly created and managed electronic retail web sites. The search engine gives retailers the ability to advertise and promote specific items or groups of items on a main search site to promote sales. Such a search site may include banners of featured items with descriptions from different web stores as well as links to those sites. Additionally a links page may be included to display a list of pertinent related sites. The search engine also provides consumers with the ability to browse possible retail sites by categories defined by the owner of the sites. Similarly items from multiple retail sites can be accessed and displayed by category with information from the their associated sites.

The search engine is able to handle queries in multiple word forms, space delineated forms, and using boolean operators. The engine searches all existing on-line stores within the retail group for the word or phrase requested and displays an associated item when found. Items returned by the search engine are categorized by the owner's site and include hyperlinks to reach these sites. These hyperlinks lead directly to the item on the owner's website and may open up a new window of the web browser.

Customers visiting the website may give feedback in the form of comments and a rating system. Such comments and rating may be viewed by the owner as well as future visitors to the site to provide a level of confidence in the site. Feedback may only be given by registered customers to protect against unprovoked or malicious responses. Such a registration includes personal information and an electronic mail address which may be used as the unique login to the system.

A computer system which is configured for carrying out the method preferably includes a web server, a client computer, and e-commerce software, which is stored in the web server and may be downloaded to the client computer for enabling the client computer to create, place, and move an e-commerce site anywhere on a computerized network, such as the Internet. The computer system, also includes a printing device electronically connected to the client computer, wherein the e-commerce software enables the printing device to print receipts, barcodes, and reports.

The method for indexing and managing a searchable community of non-HTML information is configured for use on a stand alone and/or a typical distributed computer system, wherein client computers are connected via a network to server computers. A typical combination of resources may include clients that are personal computers or workstations, and a web server that is a personal computer, a workstation, a minicomputer, and/or a mainframe. The network preferably comprises the Internet, although it could also comprise intranets, extranets, local area networks, wide area networks, etc.

Each of the computers, be they client or a web server, generally include, inter alia, a processor, random access memory, data storage devices, data communications devices, a monitor, user input devices, etc. Those skilled in the art will recognize that any combination of the above components, or any number of different components, peripherals, and other devices, may be used with the client and web server.

Each of the computers, be they client or web server, operate under the control of an operating system, such as Windows, UNIX, etc. The operating system is booted into the memory of the computer for execution when the computer is powered-on or reset. In turn, the operating system then controls the execution of one or more computer programs by the computer. In the present invention, the operating system of the client controls the execution of a web browser and the operating system of the web store generator web server controls the execution of the web server. The web browser is typically a computer program such as Netscape, Internet Explorer, etc.

The operating system and the proprietary e-commerce software are comprised of instructions which, when read and executed by the client computer, causes the client computer to perform steps necessary to implement and/or use the present invention. Generally, the operating system and/or the e-commerce software are tangibly embodied in and/or readable from a device, carrier, or, media, such as memory, data storage device, and/or data communications device connected to the client computer. Under control of the operating system the client computer, the e-commerce software may be loaded from the memory, data storage device, and/or data communications device into the memory of the client computer for a user during actual operations.

The proprietary e-commerce software automatically lists inventory for sale on a customized web site according to user input and electronic and physical sales. The proprietary e-commerce software tracks inventory, expenses, and sales for use in organizing and managing a business.

The software stands alone and does not require an additional online electronic commerce provider. To guarantee secure interface with online customers the system is compatible with the hardware interfaces of signature card readers, barcode readers, magnetic card readers, credit card readers, and fingerprint readers for payment and access verifications.

The proprietary e-commerce software may be configured for use on a program storage device, a computer usable medium, or a computer system. An appropriately configured program storage device readable by a machine would tangibly embody a program of instruction executable by the machine to perform method steps for enabling a user to generate, place, and move an e-commerce site anywhere on a computerized network, wherein the method steps would include communicatively connecting a client computer with a web generator web server, downloading e-commerce software from a web generator web server to a client computer, and generating an e-commerce web site on the client computer and uploading to e-commerce web site anywhere on the computerized network.

An appropriately configured computer usable medium would have computer readable program code means embodied therein for generating, placing, and moving an e-commerce site anywhere on a computerized network, wherein the program code means would include computer readable program code means for generating, placing, and moving an e-commerce site anywhere on a computerized network, computer readable program code means for uploading a user's inventory, computer readable program code means for tracking company expenses, computer readable program code means for generating various reports, computer readable program code means for reordering items when quantities become low, and computer readable program code means for automatically calculating taxes and shipping charges.

An appropriately configured computer system would be able to generate, place, and move an e-commerce site anywhere on a computerized network, wherein the computer system would include a processor, a memory coupled to the processor, registers coupled to the processor, a computer readable medium coupled to the memory, wherein the computer usable medium would have computer readable program code means embodied therein for generating, placing, and moving an e-commerce site anywhere on a computerized network, the program code means including computer readable program code means for generating, placing, and moving an e-commerce site anywhere on a computerized network, computer readable program code means for uploading a user's inventory, computer readable program code means for tracking company expenses, computer readable program code means for generating various reports, computer readable program code means for reordering items when quantities become low, and computer readable program code means for automatically calculating taxes and shipping charges.

Figure 5A:
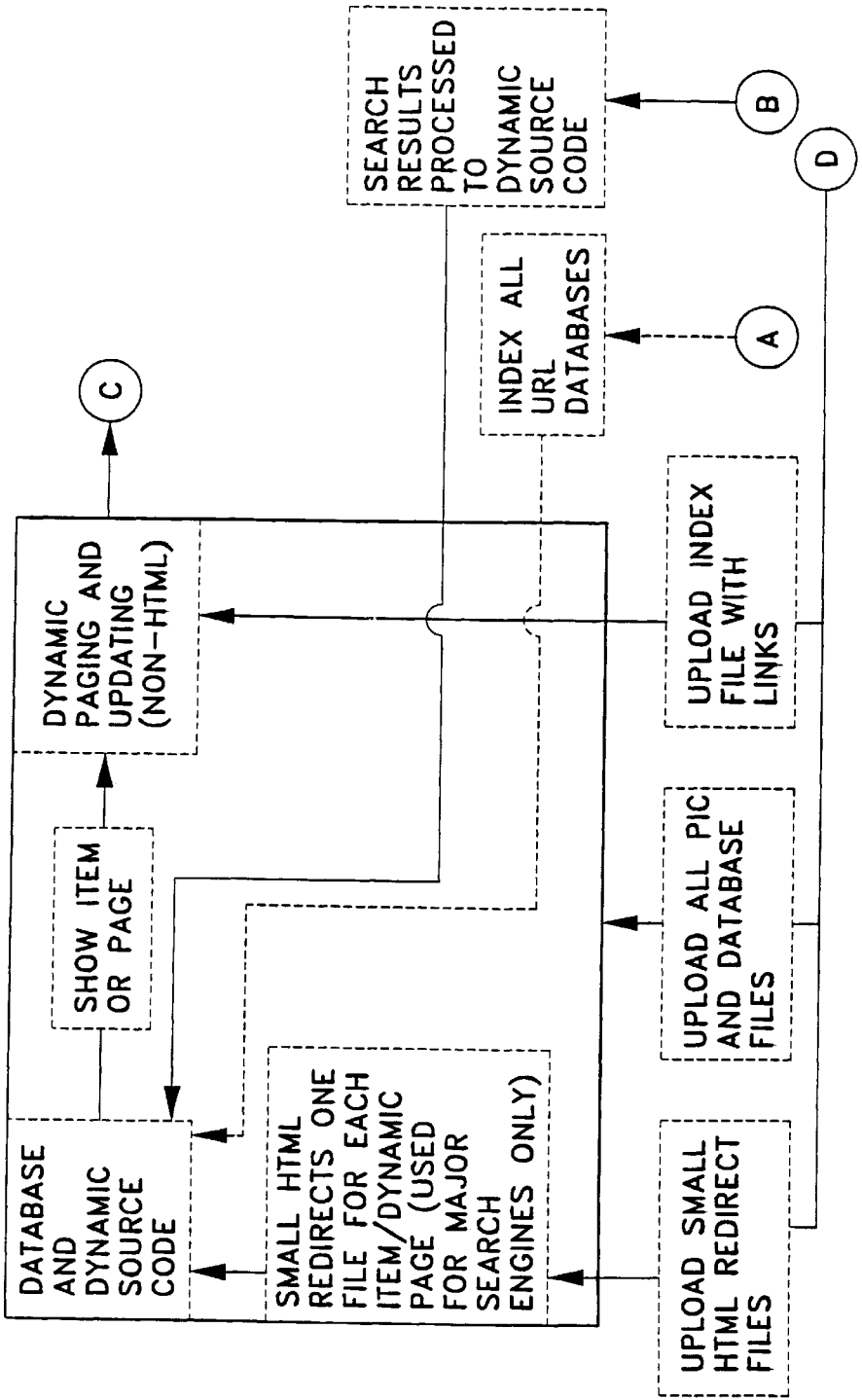
FIGS. 5A and 5B are a block diagram of the method for indexing and managing a searchable community of non-HTML information according to the present invention using a community search engine model.
Figure 5B:
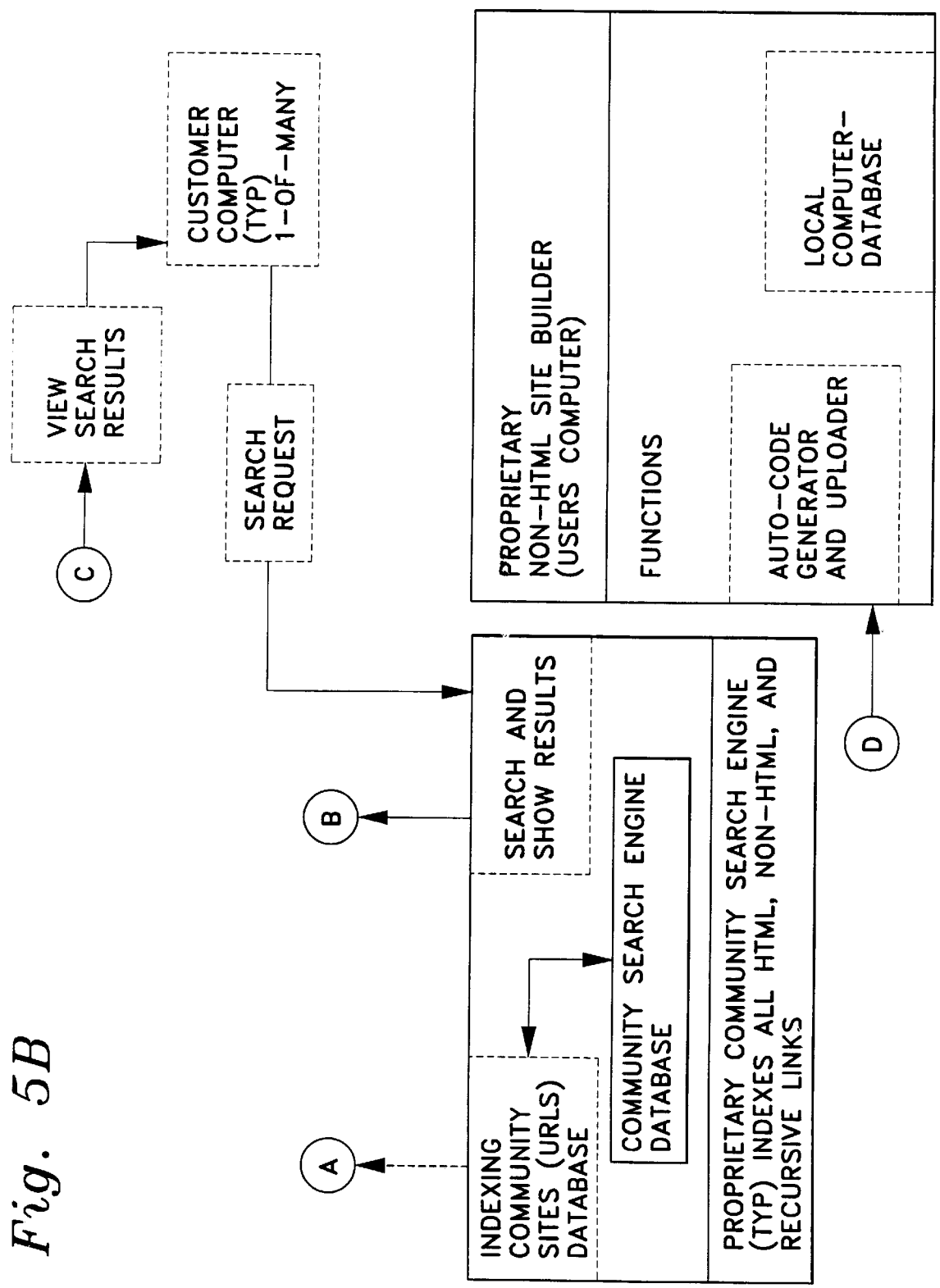

The method for indexing and managing a searchable community of non-HTML information may be used to search a group of sites having non-HTML information, with the preferred and suggested type being a community made up of electronic inventories belonging to retail sites. A preferred and suggested embodiment of the method is shown in FIGS. 5A and 5B as a block diagram of the program run by the main community site that specifically houses an electronic commerce community, the customer requesting information, and an owner'electronic database that is part of the community and is to be searched. The electronic commerce community is defined as a group or groups of online businesses constructed by similar software and administered by a main electronic commerce site. The program may be located online and may be used by the general public, specifically customers and other businesses to find, search, and review inventory items from an electronic commerce community with the system disclosed herein.

Owners of the electronic storefronts will have inputted their inventory into a non-HTML electronic database to be uploaded to their web server and the main electronic commerce site will systematically update the main community database using the search engine program. The search engine indexes all existing electronic inventory items which may be located in a variety of memory locations including over wide and local area networks. The engine may incorporate keywords and categories as defined by the owners of the electronic inventories or may selectively define its own. These non-HTML inventories are uploaded to the main electronic commerce site where files are associated with each item in the inventory.

The uploaded electronic database is received by the search engine program which uses the associated files to index the inventory into a community database. The community database can then be directly and actively searched by the community search engine as instructed by a user's query. A customer may access the search engine by way of the Internet and input a query using multiple words, space delimited phrases, and Boolean logic. Searches may be specific to item classification, by electronic inventory or a similar category.

A received search request prompts the search engine program to access the community database which may be constantly updated according to online and physical sales by each store within the community. The information returned by the search engine from the request may include items and store information and previously indexed images. The information is then used to download pertinent pieces of the owner's site associated with the items. These owner sites as well as their connected inventories may be stored on a different network or server. Together the information and images are sent to the customer and displayed as the complete item site as previously defined by the owner.

The search engine's main display has the ability to display information banners and hypertext links connected to featured sites and items. Space on the community site may be rented by electronic store owners for advertising. The advertisements can include images and owner selected information. In addition, the main search engine site may include a specific area designated for third party advertisement, which is to be kept separate from those advertisements and promotions related to the community.

To provide feedback customers may register with the community site by disclosing personal and contact information. A registered customer wishing to give such feedback could access the site by inputting a unique code such as an electronic mail address. Customer's feedback and criticism may be displayed on a particular site for owners and other customers to view. Feedback can come in the form of text or as a rating system and may be used to instill confidence in a specific electronic commerce site or the community as a whole.

Inventory control is done in real-time from the point-of-sale database. The system automatically generates and, optionally, prints barcodes which can be placed on inventoried products for inventory control. Barcode identifications pre-printed by manufacturers may also be utilized. After only a minimal amount of initial set-up (inputting his/her compnay's name and address, defining taxation and shipping tables, selecting colors, backgroundd images, etc.), which needs to be done only once, the business' web site can be updated as frequently as desired to reflect current inventory levels and products available over the Internet with only a single click of the mouse. The system functions on a day-to-day level as a computer-based point-of-sale system that maintains a database of current inventory with re-order points, various reports, "cash-register" receipts, etc. Access by users to the point of sale system, as well as to other portions of the invention, are controlled by password and predefined security levels.

It is to be understood that the present invention is not limited to the embodiments described above, but encompasses any and all embodiments within the scope of the following claims.

We claim:

1. A method for indexing and managing a searchable community database of non-HTML information comprising the steps:

establishing the searchable community database of non-HTML information at a first online Internet site, the searchable community database having an electronic search engine;

creating at least one website for a retail outlet by executing stand alone proprietary website generation software on a merchant computer of the retail outlet, where the proprietary website generation software generates a non-HTML indexing file and all associated HTML files for the retail outlet that are uploaded to a second online Internet site different from the first online Internet site, and the proprietary website generation software does not use any server side software, installation, or setup;

enrolling the at least one created website in the searchable community database of non-HTML information;

automatically retrieving, by the electronic search engine, non-HTML indexing files generated by the proprietary website generation software for enrolled websites created by the proprietary website generation software;

populating, indexing, and categorizing the searchable community database with non-HTML indexing files of enrolled websites created by the proprietary website generation software;

dynamically creating HTML result pages, initiated by an Internet query, for viewing, which include hyperlinks to the associated HTML files, created and uploaded to associated enrolled websites created by the proprietary website generation software, paginating, and providing item information from the searchable community database; and systematically updating the searchable community database using the non-HTML indexing files of enrolled websites created by the proprietary website generation software.

2. The method according to claim 1, further comprising downloading the non-HTML information using HTTP, parsing the non-HTML information, and indexing the non-HTML information with unique parameters into a database running on the search engine.

3. The method according to claim 1, further comprising accessing the electronic search engine and inputting a query.

4. The method according to claim 3, wherein the accessing step further comprises inputting a query using multiple words.

5. The method according to claim 3, wherein the accessing step further comprises inputting a query using space delimited words.

6. The method according to claim 3, wherein the accessing step further comprises inputting a query using Boolean logic.

7. A computer useable medium carrying thereon indexing and managing instructions for a searchable community database of non-HTML information which, when executed by a processor, cause that processor to carry out steps:

establishing the searchable community database of non-HTML information at a first online Internet site, the searchable community database having an electronic search engine;

creating at least one website for a retail outlet by executing stand alone proprietary website generation software on a merchant computer of the retail outlet, where the proprietary website generation software generates a non-HTML indexing file and all associated HTML files for the retail outlet that are uploaded to a second online Internet site different from the first online Internet site, and the proprietary website generation software does not use any server side software, installation, or setup;

enrolling the at least one created website in the searchable community database of non-HTML information;

automatically retrieving, by the electronic search engine, non-HTML indexing files generated by the proprietary website generation software for enrolled websites created by the proprietary generation software;

populating, indexing, and categorizing the searchable community database with non-HTML indexing files of enrolled websites created by the proprietary generation software;

automatically creating HTML result pages, initiated by an Internet query, for viewing, which include hyperlinks to the associated HTML files created and uploaded to associated enrolled websites created by the proprietary website generation software, paginating, and providing item information from the searchable community database; and systematically updating the searchable community database using the non-HTML indexing files of enrolled websites created by the proprietary website generation software.

8. The computer useable medium according to claim 7, wherein said indexing and managing instructions which, when executed by the processor, further cause that processor to carry out steps comprising:

downloading the non-HTML information using HTTP, parsing the non-HTML information, and indexing the non-HTML information with unique parameters into a database running on the search engine.

9. The computer useable medium according to claim 7, wherein said indexing and managing instructions which, when executed by the processor, further cause that processor to carry out steps comprising:

accessing the electronic search engine and inputting a query.

10. The computer useable medium according to claim 9, wherein said accessing step further comprises inputting a query using multiple words.

11. The computer useable medium according to claim 9, wherein said accessing step further comprises inputting a query using space delimited words.

12. The computer useable medium according to claim 9, wherein the accessing step further comprises inputting a query using Boolean logic.

* * * * *